(12) United States Patent
Castanho et al.

(10) Patent No.: US 8,516,047 B2
(45) Date of Patent: Aug. 20, 2013

(54) SYSTEM AND METHOD FOR SERVICE SPECIFIC NOTIFICATION

(76) Inventors: Rick Castanho, Nashua, NH (US); Jeffrey Delaney, Hudson, NH (US); William Harry Kirtley, Arlington, MA (US); Robert Kuszewski, Arlington, MA (US); Robert Matthews, Somerville, MA (US); David A. Page, Manchester, MA (US); Gregory Charles Warden, Belmont, MA (US)

( * ) Notice: Subject to any disclaimer, the term of this patent is extended or adjusted under 35 U.S.C. 154(b) by 0 days.

(21) Appl. No.: 11/654,145

(22) Filed: Jan. 16, 2007

(65) Prior Publication Data
US 2007/0118599 A1 May 24, 2007

Related U.S. Application Data

(63) Continuation of application No. 10/007,461, filed on Nov. 5, 2001, now abandoned.

(60) Provisional application No. 60/246,140, filed on Nov. 6, 2000.

(51) Int. Cl.
*G06F 15/16* (2006.01)
*G06Q 30/00* (2012.01)

(52) U.S. Cl.
USPC .......... 709/204; 709/205; 709/206; 709/207; 705/13; 705/14.4; 705/14.49

(58) Field of Classification Search
USPC .................... 709/204; 719/318; 715/700
See application file for complete search history.

(56) References Cited

U.S. PATENT DOCUMENTS 4,554,418 A * 11/1985 Toy ............................ 379/88.01
4,941,168 A    7/1990 Kelly, Jr.
(Continued)

FOREIGN PATENT DOCUMENTS

WO    98/12531    6/1998
WO    WO 00/48351    8/2000
(Continued)

OTHER PUBLICATIONS

Vehicle, From Wikipedia, the free encyclopedia, obtained from the Internet at: http://en.wikipedia.org/wiki/Vehicle, pp. 1-4.*
(Continued)

*Primary Examiner* — Backhean Tiv
(74) *Attorney, Agent, or Firm* — Cooley Manion Jones LLP (57) ABSTRACT

Apparatus include a communication interface, a trigger interface, computer-readable media encloded subscriber-originated recipient list data, and a user interface. The user interface is configured to display and receive input from, via a computer screen display, plural sets of screen-displayed destination setting selection indicators for individually configuring sets of destination settings for corresponding event types. Each set of destination settings corresponds to a corresponding one of plural selectable event types selectable for causing corresponding triggered messages to be sent including sending the given event-specific message to the corresponding list of recipients. Individual ones of the selectable event types for a given user have corresponding differently configurable sets of destination settings, whereby the given user's selected destination settings for one selected event type cause one event-specific message to be sent to one device of the given user and the given user's selected destination settings for another selected event type cause another event-specific message to be sent to another device of the given user that is different than the one device. Meanwhile, selected ones of the selectable event types for the given user are selected by a user selecting, via the computer screen display, destination selection indicators corresponding to the selected ones of the selectable event types.

16 Claims, 3 Drawing Sheets

(56) References Cited

U.S. PATENT DOCUMENTS

| | | |
|---|---|---|
| 4,972,461 A | 11/1990 | Brown et al. |
| 5,179,660 A | 1/1993 | Devany et al. |
| 5,287,498 A | 2/1994 | Perelman et al. |
| 5,371,787 A | 12/1994 | Hamilton |
| 5,400,020 A | 3/1995 | Jones |
| 5,623,260 A | 4/1997 | Jones |
| 5,657,010 A | 8/1997 | Jones |
| 5,668,543 A | 9/1997 | Jones |
| 5,673,256 A | 9/1997 | Maine |
| 5,706,334 A | 1/1998 | Balk et al. |
| 5,740,231 A | 4/1998 | Cohn et al. |
| 5,742,905 A | 4/1998 | Pepe et al. |
| 5,758,088 A | 5/1998 | Bezaire et al. |
| 5,790,974 A * | 8/1998 | Tognazzini ............ 455/456.5 |
| 5,794,039 A | 8/1998 | Guck |
| 5,796,394 A | 8/1998 | Wicks et al. |
| 5,805,676 A | 9/1998 | Martino |
| 5,809,242 A | 9/1998 | Shaw et al. |
| 5,818,447 A | 10/1998 | Wolf et al. |
| 5,838,252 A | 11/1998 | Kikinis |
| 5,841,966 A | 11/1998 | Irribarren |
| 5,848,396 A | 12/1998 | Gerace |
| 5,850,594 A | 12/1998 | Cannon et al. |
| 5,870,454 A | 2/1999 | Dahlen |
| 5,872,926 A | 2/1999 | Levac et al. |
| 5,875,436 A | 2/1999 | Kikinis |
| 5,892,909 A | 4/1999 | Grasso et al. |
| 5,903,830 A | 5/1999 | Joao et al. |
| 5,905,777 A | 5/1999 | Foladare et al. |
| 5,928,325 A | 7/1999 | Shaughnessy et al. |
| 5,940,475 A | 8/1999 | Hansen |
| 5,940,478 A | 8/1999 | Vaudreuil et al. |
| 5,956,681 A | 9/1999 | Yamakita |
| 5,960,406 A | 9/1999 | Rasansky et al. |
| 5,964,833 A | 10/1999 | Kikinis |
| 5,966,663 A | 10/1999 | Gleason |
| 5,987,103 A | 11/1999 | Martino |
| 6,014,429 A | 1/2000 | LaPorta et al. |
| 6,021,433 A | 2/2000 | Payne et al. |
| 6,026,433 A | 2/2000 | D'Arlach |
| 6,034,970 A | 3/2000 | Levac et al. |
| 6,038,542 A * | 3/2000 | Ruckdashel ............ 705/7.18 |
| 6,044,382 A | 3/2000 | Martino |
| 6,067,568 A | 5/2000 | Li et al. |
| 6,072,862 A | 6/2000 | Srinivasan |
| 6,112,049 A | 8/2000 | Sonnenfeld |
| 6,148,332 A | 11/2000 | Brewer et al. |
| 6,175,831 B1 | 1/2001 | Weinreich et al. |
| 6,215,858 B1 | 4/2001 | Bartholomew et al. |
| 6,278,936 B1 | 8/2001 | Jones |
| 6,313,760 B1 | 11/2001 | Jones |
| 6,317,060 B1 | 11/2001 | Jones |
| 6,359,557 B2 | 3/2002 | Bilder |
| 6,363,323 B1 | 3/2002 | Jones |
| 6,363,414 B1 | 3/2002 | Nicholls et al. |
| 6,363,415 B1 | 3/2002 | Finney et al. |
| 6,393,107 B1 | 5/2002 | Ball et al. |
| 6,396,920 B1 | 5/2002 | Cox et al. |
| 6,400,810 B1 * | 6/2002 | Skladman et al. ....... 379/93.24 |
| 6,411,891 B1 | 6/2002 | Jones |
| 6,415,207 B1 | 7/2002 | Jones |
| 6,438,584 B1 | 8/2002 | Powers |
| 6,442,250 B1 | 8/2002 | Troen-Krasnow et al. |
| 6,442,592 B1 | 8/2002 | Alumbaugh et al. |
| 6,486,801 B1 | 11/2002 | Jones |
| 6,492,912 B1 | 12/2002 | Jones |
| 6,496,568 B1 * | 12/2002 | Nelson ................. 379/88.12 |
| 6,498,835 B1 | 12/2002 | Skladman et al. |
| 6,510,383 B1 | 1/2003 | Jones |
| 6,574,314 B1 | 6/2003 | Martino |
| 6,574,630 B1 * | 6/2003 | Augustine et al. ............ 707/10 |
| 6,597,688 B2 | 7/2003 | Narasimhan et al. |
| 6,609,106 B1 * | 8/2003 | Robertson ................ 705/5 |
| H2079 H | 9/2003 | Menon et al. |
| 6,618,668 B1 | 9/2003 | Laird |
| 6,630,883 B1 | 10/2003 | Amin et al. |
| 6,631,258 B1 | 10/2003 | Chow et al. |
| 6,631,363 B1 * | 10/2003 | Brown et al. ............. 707/1 |
| 6,647,257 B2 | 11/2003 | Owensby |
| 6,681,245 B1 * | 1/2004 | Sasagawa ............. 709/206 |
| 6,683,542 B1 | 1/2004 | Jones |
| 6,725,446 B1 | 4/2004 | Hahn et al. |
| 6,829,334 B1 | 12/2004 | Zirngibl et al. |
| 6,842,772 B1 | 1/2005 | Delaney et al. |
| 6,999,565 B1 | 2/2006 | Delaney et al. |
| 7,069,309 B1 * | 6/2006 | Dodrill et al. ........... 709/219 |
| 7,085,994 B2 * | 8/2006 | Gvily .................. 715/234 |
| 7,243,130 B2 * | 7/2007 | Horvitz et al. ........... 709/207 |
| 8,346,626 B2 * | 1/2013 | Robertson ............. 705/26.8 |
| 2001/0005859 A1 | 6/2001 | Okuyama et al. |
| 2001/0016868 A1 | 8/2001 | Nakamura et al. |
| 2001/0034694 A1 * | 10/2001 | Elias ................... 705/37 |
| 2002/0005867 A1 * | 1/2002 | Gvily .................. 345/760 |
| 2002/0046091 A1 * | 4/2002 | Mooers et al. ............ 705/14 |
| 2002/0065889 A1 | 5/2002 | Macor |
| 2002/0065890 A1 | 5/2002 | Barron |
| 2002/0069116 A1 | 6/2002 | Ohashi et al. |
| 2002/0077130 A1 | 6/2002 | Owensby |
| 2002/0102993 A1 | 8/2002 | Hendrey et al. |
| 2002/0103737 A1 * | 8/2002 | Briere .................. 705/36 |
| 2002/0156896 A1 | 10/2002 | Lin et al. |
| 2002/0160794 A1 | 10/2002 | Tisserand et al. |
| 2002/0161841 A1 | 10/2002 | Kinnunen |
| 2002/0165923 A1 | 11/2002 | Prince |
| 2002/0177456 A1 | 11/2002 | Kimoto et al. |
| 2003/0088434 A1 | 5/2003 | Blechman |
| 2003/0088465 A1 | 5/2003 | Monteverde |
| 2003/0110225 A1 | 6/2003 | Billadeau |
| 2003/0126216 A1 | 7/2003 | Avila et al. |
| 2003/0154257 A1 | 8/2003 | Hantsch et al. |
| 2003/0161448 A1 | 8/2003 | Parolkar et al. |
| 2003/0163536 A1 | 8/2003 | Pettine, Jr. |
| 2003/0177277 A1 | 9/2003 | Dascalu |
| 2003/0195937 A1 | 10/2003 | Kircher, Jr. et al. |
| 2003/0204556 A1 | 10/2003 | Bernard |
| 2003/0208363 A1 | 11/2003 | Thurnher |
| 2003/0208545 A1 | 11/2003 | Eaton et al. |
| 2006/0265462 A1 * | 11/2006 | Stark et al. ............. 709/206 |
| 2007/0192422 A1 * | 8/2007 | Stark et al. ............. 709/206 |
| 2008/0281719 A1 * | 11/2008 | Hall et al. .............. 705/26 |

FOREIGN PATENT DOCUMENTS

| | | |
|---|---|---|
| WO | 01/02981 | 1/2001 |
| WO | WO 01/58119 | 8/2001 |
| WO | WO 01/67284 | 9/2001 |
| WO | WO 01/69385 | 9/2001 |
| WO | WO 02/87095 | 1/2002 |
| WO | WO 02/37393 | 5/2002 |
| WO | WO 03/021796 | 3/2003 |

OTHER PUBLICATIONS

Brunson, Gordon R., et al. Unified Messaging—A Value-Creating Engine for Next-Generation Network Services, Bell Labs Technical Journal, Apr.-Jun. 1999, 71-87, USA.

Martino, R., et al. Wireless Medical Technology, Cyber Technology Group, Inc.

UNI-LINK—Ahead of the Curve, Cyber Technology Group, Inc., Feb. 12, 2003.

* cited by examiner

SYSTEM AND METHOD FOR SERVICE SPECIFIC NOTIFICATION

CROSS-REFERENCE TO RELATED APPLICATIONS

The present application is a continuation of U.S. application Ser. No. 10/007,461 (now abandoned), filed on Nov. 5, 2001, which claims the benefit of U.S. Provisional Application No. 60/246,140, filed Nov. 6, 2000. The content of each of these applications is hereby expressly incorporated herein by reference in their entirety.

STATEMENT REGARDING FEDERALLY SPONSORED RESEARCH OR DEVELOPMENT (Not Applicable)

BACKGROUND

1. Field of the Disclosure

The present disclosure relates to sending messages to selected recipients, and more particularly to predefining triggering happenings and programming the form, content, the time of sending, the delivery method and other such specifics by sender and/or the recipient 2. Background Information Today's technology allows people to communicate with each other using a broad array of communications services. The old telephone networks, facsimile, automatic call distribution systems, the Internet, and wireless technologies (pagers, PDA's, cell phones, etc.) provide the user with many reasonably flexible options for communication services. With respect to the Internet, the typical Internet web service allows a user to subscribe to the service using a single email address. Message delivery services utilize email lists to communicate with subscribers. One limitation with this model is that the recipient is limited to "how" they want to receive information. The recipient does not specify "when" to receive information.

Another limitation that arises due to the myriad of communication services is that any particular recipient may be temporarily most conveniently reached by only one or two of the many ways. Therefore the expansion of the communications techniques, not withstanding options like call forwarding and recording, risks non-delivery or long waiting periods before the designated recipient receives the message.

There is a continuing need to address these limitations by allowing users to create expansive and flexible profiles and rules linking notification events to people and devices.

SUMMARY OF THE DISCLOSURE

In accordance with one embodiment, apparatus may be provided, including a communication interface, a trigger interface, computer-readable media encloded subscriber-originated recipient list data, and a user interface. The communication interface is configured to communicate with a message delivery system and adapted to cause, via the message delivery system, a given event-specific message to be sent to a corresponding list of recipients. The trigger interface is configured to receive an indication that a given event has occurred and to trigger sending of the given event-specific message. The computer-readable media encoded subscriber-originated recipient list data represents the corresponding list of recipients, where the corresponding list of recipients originated from inputs by event subscribers. The user interface is configured to display and receive input from, via a computer screen display, plural sets of screen-displayed destination setting selection indicators for individually configuring sets of destination settings for corresponding event types. Each set of destination settings corresponds to a corresponding one of plural selectable event types selectable for causing corresponding triggered messages to be sent including sending the given event-specific message to the corresponding list of recipients. Individual ones of the selectable event types for a given user have corresponding differently configurable sets of destination settings, whereby the given user's selected destination settings for one selected event type cause one event-specific message to be sent to one device of the given user and the given user's selected destination settings for another selected event type cause another event-specific message to be sent to another device of the given user that is different than the one device. Meanwhile, selected ones of the selectable event types for the given user are selected by a user selecting, via the computer screen display, destination selection indicators corresponding to the selected ones of the selectable event types.

BRIEF DESCRIPTION OF THE DRAWINGS

The description below refers to the accompanying drawings, of which.

DETAILED DESCRIPTION

The present disclosure addresses the above limitations and problems of known systems. First, users can subscribe to notification events via any device type (phone, fax, email, pager, SMS (Short Message Service), WAP (Wireless Application Protocol), PDA or other wireless device). This empowers the user to prioritize and specify "how" to receive a notification. In addition, the present disclosure provides an extensive and flexible scheduling feature allowing the user to specify "who" and "when" (and where if not contained in the "how") to receive each notification. Recipients are those designated to receive the messages or notifications, and recipients may be users, administrators or third parties. For example, third parties may be government or regulatory agencies and/or officials, and similar types of organizations and/or officials.

The illustrated embodiment with the advantages of specifying "how" and "when" to receive many different types of information enhances the traditional Internet service subscription type applications. As an example, with the illustrated embodiment recipients can now choose to receive critical information at work Monday through Friday between the hours of 9:00 AM and 5:00 PM. In addition, recipients can create scheduling profiles to include times the recipients are commuting, at home, asleep, and traveling.

One aspect of the illustrated embodiment allows senders to predefine happenings such as market corrections, virus alerts, imminent power outages or flight cancellations, etc., while allowing recipients (customers, partners, suppliers and employees) to create their own profiles specifying an embodiment of a contact method, receiving device and timing for each type of happening to which they want to subscribe. This combination of sender and recipient functionality means organizations can integrate communications with business processes, thereby automating critical communications and saving both time and money.

User recipients can create and maintain a personal profile detailing the happenings to which they want to subscribe and be notified, the device by which they would like to be contacted, and any specifications they may have about timing requirements.

An advantage of the illustrated embodiment is that it enables message senders to predefine recurring happenings and empowers user recipients to maintain and automate their own contact information, communications. By programmatically matching appropriate recipients with happenings, time, money and effort normally spent updating distribution lists and getting the word out is saved, freeing personnel to focus on business. Recipients receive only the meaningful notifications, quickly, and in their preferred manner.

U.S. Ser. No. 09/496,170 (issued as U.S. Pat. No. 6,999,565), filed on Feb. 1, 2000 and entitled Multi-Mode Message Routing and Management (the entire disclosure of which is hereby incorporated by reference) discloses, inter alia, a delivery system for transmitting messages to a selected single or multiple recipients by means of one or more communication means and/or devices. Such a delivery system is used, in an embodiment of the present disclosure to be the delivery system for the messages being sent. Such communication modalities may include, for example, conventional or wireless telephone and telephone systems, facsimile transmission, pager, e-mail and Internet, SMS, WAP, and PDA. The illustrated system in an embodiment may be configured to respond to a variety of rules that specify conditions under which different delivery means and devices may be employed. For example, the rules may specify that if there is no response the message is re-sent or an e-mailed question may be sent within an hour, or the recipient is to be telephoned. Moreover, in addition to alternative transmission means, the rules may specify alternative recipients (as well as alternative modalities for those recipients). The escalation rules may also specify default contact methods, which may apply to specific individuals or to lists of recipients.

Embodiments disclosed herein may be configured to support a number of business models. Embodiments when practiced on the Internet may be considered, in the Internet Layering Model used to describe the functions particularly on the Internet, to operate at the application layer five. When layers are discussed herein they refer to this model.

In describing certain embodiments herein, some terms may be used herein with meanings as follows:

Customers, in certain embodiments, may be contracted individuals or organizations who use an embodiment of the illustrated system to provide one or more "services" for their own customers, who are the service's users.

Services may be, for certain embodiments, particular customized versions of the system or application, accessible through a web browser and a specific URL. A customer may have more than one service. The illustrated system may be designed to allow customization, for example, branding with a customer's logo. In one embodiment herein, there is a fallback service that contains default values for most customizable parameters, but it is not a functional service accessible to users.

In embodiments herein, events may be notifications to users, e.g., by one or more types of messages sent by services which are subscribed to by the users. Event names can be customized (e.g. alerts, notifications) in different services as programmed by the customer.

Users or members, in embodiments herein, may, e.g., be those individuals who have the ability to log in to the service, and who may or may not be "subscribed" to receive events.

In embodiments herein, the term "subscription" may, e.g., be in reference to billing plans to describe those operations which involve a monetary transaction—e.g. a member of a service may be required to pay a sum of money by credit card to subscribe to the service; this is a "subscription" billing plan, a plan in which the user pays for access to the service. The second meaning is the "corporate" billing plan—used for customers who control the membership of the service internally, and who typically pay periodically for message volume.

In embodiments, the term "subscription" may refer to the process by which members of all services select events to receive. Becoming a member of a service by any means (sign-up or creation by an administrator of the service)—or even the monetary transaction described above, although it may be a necessary precursor—does not mean that a user has actually selected events to receive. When a user of any billing plan in any plan selects an event, the user is said to be "subscribed" to that event. In certain embodiments herein, regardless of billing status, a user may not be considered to be "subscribed" until the user has selected at least one event to receive.

In embodiments herein, privileges may be authorizations to perform one or more of a group of operations. The specific operations include operations that may be specific to customers. A non-exhaustive list of privileges for certain embodiments herein includes:

Log in to the service
Create a member (create an account for a new user)
Delete a member (remove his account from the service)
Enable/disable members (temporarily suspend log-in and subscription rights)
Edit a member (modify a user's account information)
Create an event (define and launch an alert/notification)
Track deliveries (access records of prior events)
Assign privileges to members In embodiments herein administrators typically include personnel of a customer that has authorization to more privileges than a user (see below). For example, a master administrator may be a person that has authorization to perform all the privileges. The use of administrators provides customers with "administrative" features—the ability to create users in various ways, edit the account and subscription information of the members, create and launch events, and review the history of prior events. For example, a "master administrator" may be defined as one who is authorized to exercise all the privileges available.

Role: An aggregation of certain authorized privileges vested in a user. A user may have more than one role. Privileges are checked to determine what operations a user is allowed to perform, and also what pages are presented to that user and what elements that user sees in menus.

Every individual who creates an account (or for whom an account is created) is assigned a role as a "user." A user has the ability to log in to the service for which his account was created, to modify his password and security question, to subscribe to the events of that service, to edit and save his contact information, and to define schedules which establish which events will be delivered to which contact devices at what times.

Any role that embodies privileges greater than this is considered an administrator's role. When a service is created, two roles are typically created with it—user and master administrator. The master administrator may be assigned to one or more individuals. In some instances the customer may want the administrator to be a third party. Other administrators are created and defined by the customer by aggregating the appropriate privileges into a role entity that can be assigned to users (in addition to the "user" role). Examples of roles might be "member administrator" with the ability to create and delete members, edit member account information, and enable/disable members—or "event administrator"—the authority to create and launch an event, and to view the historical records of events for that service.

Administrators who have the privilege of assigning privileges may bestow the privileges they themselves have upon other individuals. This structure of roles and privileges, combined with the functionality of the illustrated system keyed to such roles and privileges, makes it possible for customers to administer their own services to manage situations which relate to changing personnel or modification of membership, and to respond promptly to the concerns or questions of the users of their service.

The illustrated system may handle other, complex models, for example, as follows.

A "multi-service" portal, in which a variety of notification services—e.g. community or state government, travel, hobby groups, topical news headline service—are available for new members to subscribe to. Members of the XYZ service could subscribe or unsubscribe at will to the various secondary services, and financial transactions would be routinely handled as part of this operation. Any change in contact information would automatically affect all subscriptions with no effort on the part of the member, and the member would further be able to change the way in which the member received each notification.

A feature of an embodiment that makes the above possible is called a "context." Whenever an individual becomes a user of a service, the user is given a "context" in a database related to that service. A user is allowed to log in to the service only if the user has a context for, i.e. is a subscribed member of, that service. A user, then, can have a single account but multiple contexts and be a member of multiple services. This approach provides the user with the advantage to maintain a single central record of the user's contact information. In the example above, for instance, the user could have a context for the XYZ service, allowing him to log in to the XYZ site, and also have contexts for, for example, a news service's Headline Notifications, Bargain Flight Alerts, and, say, the Local Power Company alerts.

When an administrator of a service "deletes" a member, the member is not in fact removed from the database—the member's context for that service is deleted. The member is no longer a member of that service, and cannot log in, but his basic account, contact information, and memberships in other services are unaffected.

Templates:

Templates allow the customer to modify the look, functionality and voice messages of their custom service. There are two types of templates: user interface (UI) templates, and message delivery (MD) templates.

The UI templates are web pages that are customizable by the customer for specific customer needs. The illustrated application uses many web pages to allow users to enter data, navigate the application and receive notifications. While the basic functionality of these pages does not change, many of the details of the pages can be modified to meet the customer's needs.

UI templates are designed to allow for the modification of one or more of the following non-exhaustive list of graphical elements:

Text Color
Background Color
Text Size and Style
Page Design Elements
Logos and links to other customer web pages In addition a customer can request the form and substance of the text on the web pages.

UI templates also allow the customer to provide specific information. Some examples are:

Adding pre-defined lists of options such as a list of airports or months.
Adding pre-populated text boxes such as entering today's date in a form by default.
Adding the ability to provide customer specific information such as flight numbers, account numbers or sales person's name.

MD templates provide customers with means for delivering customized messages or notifications. Each customer might have unique templates for sending fax, email, SMS, or voice messages. Message templates retrieve the information provided in the UI templates to create a personalized message. Modifications to MD templates include, among others, voice recordings, graphics, text or content changes. Moreover MD templates may be used to create a proprietary look and feel and to conform to their standard corporate communication and branding requirements.

In some embodiments the ability to modify such templates may be vested with the system's owner/developer, but in other embodiments customers and or other third parties may be so authorized.

Some examples of customizations include:
Adding a company logo to a fax or a fax cover page.
Adding custom information, such as account numbers or overdue balances to a fax, email, sms or voice messages.
Making custom layout changes to a fax to give the appearance of a form
Adding links to customer websites in emails
Recording professional voice prompts for messages delivered over the phone.

Figure 1:
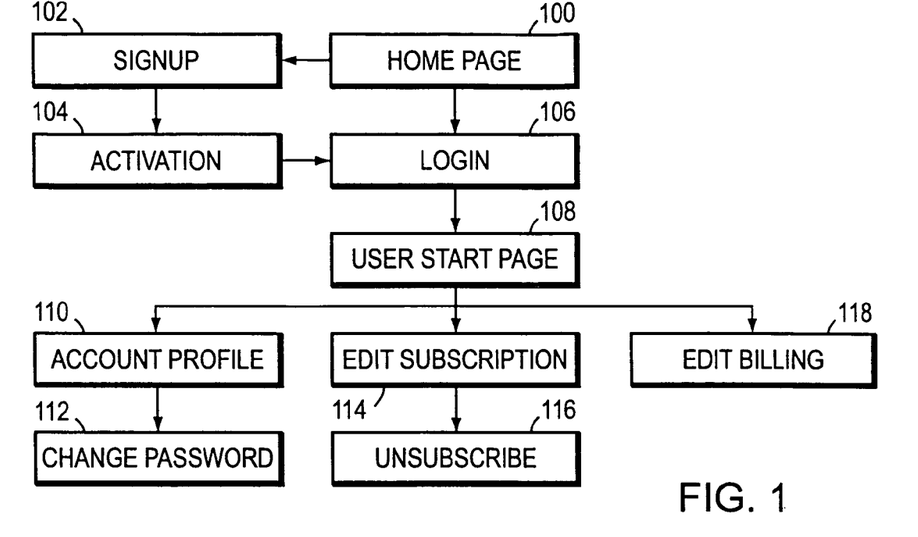
FIG. 1 is a flow chart incorporating the illustrated embodiment.

FIG. 1 shows a flow of activities that a user would use when communicating with the disclosed system. The user accesses the Home Page 100 as typically accomplished over the Internet. Users register 102 an identity with the application. Once a user signs up, the login name provided during the registration can be used to subscribe to multiple services across multiple portals.

Users must establish a unique login name and password along with other additional required fields in order to complete the signup process. Once the signup process is complete, an email is immediately delivered to the user containing an activation link.

A newly created member is created as "inactive" and can only be activated by responding to the URL sent in the activation email. Clicking on the URL will force the user to enter their username and password to activate 104 their account.

Once the account is activated, users can login 106 by providing their login name and password at the login screen. A user start page 108 is then presented to the user.

From the user start page, the user can access the Account Profile page 110 that allows the user to edit the users own profile and specifically enter their contact information. Specific contact information entries are required to subscribe to events provided by the disclosed system. The only required contact information entry is the Work Email address. All other contact information is optional. Within the Account Profile page is the link 112 for changing the password. The user must type in the original and enter the new password.

Before a user can begin receiving messages from a service, the user must first subscribe to that service. A user signing up and establishing a unique login "name" does not automatically subscribe that user to a service. The user start page 108 lists service(s) available to the user for subscribing. In a single service portal, there will always be only one service available, whereas in a multi-service portal there are many services available for subscription. Each service may require additional information to complete the subscription process. For example, an airline service may require the user to enter their frequent flyer number. Also many services will require a billing plan be established before the subscription is completed.

Figure 4:
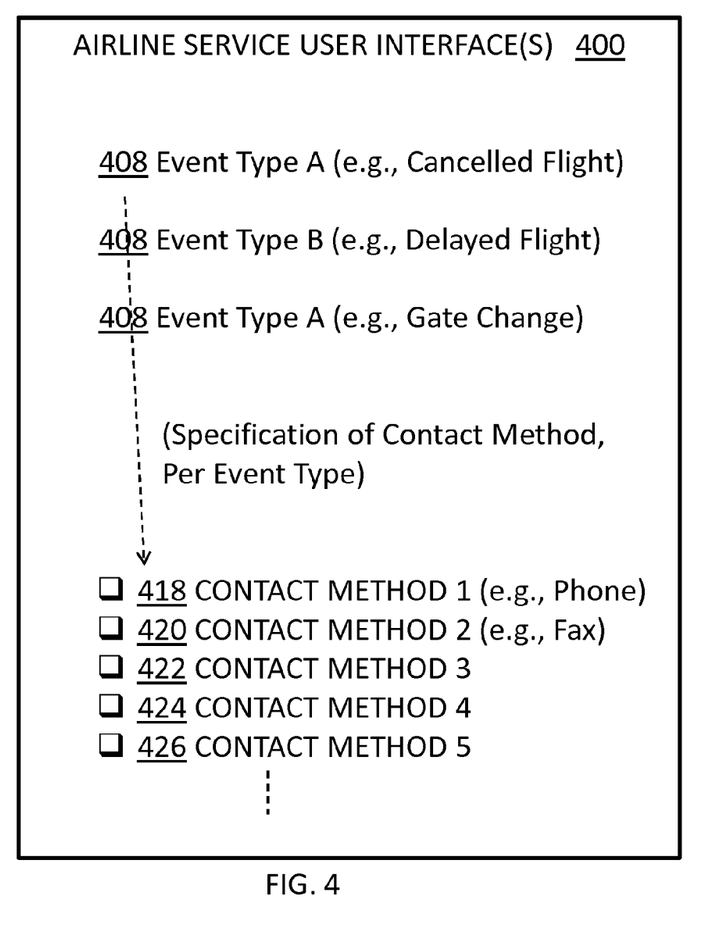
FIG. 4 is a schematic diagram of a notification service user interface.

Once the user has subscribed to a service, the next step is to select events provided by that service. For example, an airline service user interface 400 as shown in FIG. 4 would typically provide the events (1) Cancelled Flight (Event Type A 408), (2) Delayed Flight (Event Type B 408), and (3) Gate Change (Event Type C 408). The user selects an event by specifying how they want to be contacted per event. A check box for each contact method is listed next to each service event. The illustrated contact methods include contact methods 1-5 418, 420, 422, 424, 426, as shown in FIG. 4, each with a check box.

Within the service subscription page 114, a link allows the user to unsubscribe 116 to that service. Unsubscribing first gives the user the opportunity to confirm the selection. Once confirmed, the user is unsubscribed to the service.

Each service can be configured to require the user to setup a special billing plan 118. For example, one plan might require the user to setup a subscription based credit card billing plan with a $100 a year fee. Other services may provide the service for free to the users and pick up the costs on the back end. If a billing plan is required, it is presented to the user during the service subscription.

Figure 2:
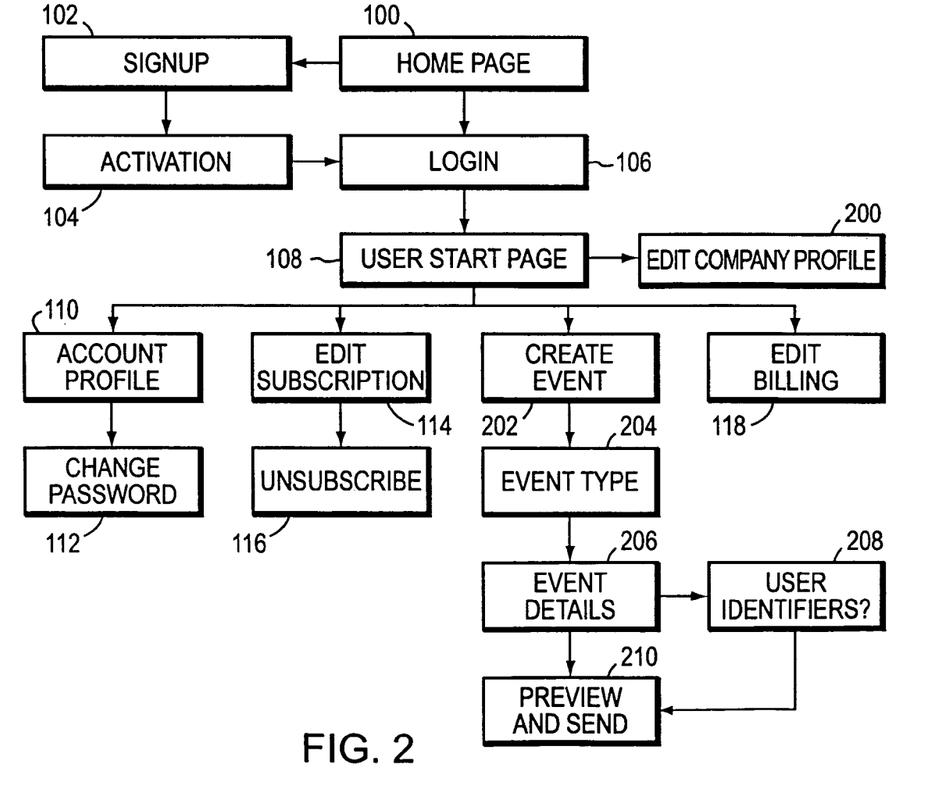
FIG. 2 is a second flow chart extending that of FIG. 1.

FIG. 2 shows the flow of activities that an administrator would use when communicating with the disclosed system. The experience is the same as for a user except that an administrator has the additional privileges to Edit Company profile, Create Events. In addition the administrator has the authorization to manage the service members, and to track the delivery progress of each message delivery.

The Edit Company Profile 200 allows the administrator to edit and change basic company information.

Events are notifications that the service administrator creates to alert the subscribed members. For an airline, the events are triggered by happenings as indicated, e.g. "Cancelled flight," "Delayed flight," etc. The Create Event 202 feature offers a "wizard-like" (a known term in the art) flow for creating the event.

Event Type, 204 allows the administrator to select the happening and event type. The event types are pre-determined by the disclosed system when the service is created.

The Event Details 206 screen contains the common and specific details for a given event. The common event fields include the Subject, Sender name, return email, fax number, and pager callback number. The contact information specific fields are derived by default from the company profile.

User Identifiers 208 targets specific members in addition to their general subscription membership to receive an event. For example, a United Airlines service could have thousands of subscribers for the Cancelled flight event. However, when this event is triggered, the Administrator clearly does not want to notify all subscribers for this event, but rather only those that are affected by it (i.e. on that plane). The service does this through a feature called User Identifiers 208. This feature allows an Administrator the option of providing a list of user identifiers affected by this event.

Preview and Send 210, the final page, is the Preview and Send page. This page summarizes the above selection processes. Pressing Send from this page submits the event to the subscribed users.

After the administrator presses send, the disclosed system returns to the user "Your message is being sent page." During this time the disclosed system queries the database to find all members who have subscribed to the service event being triggered (taking into consideration the optional user identifiers). Based on this information, the appropriate XML request document is dynamically created and handed to the delivery system is as described above, in a preferred embodiment, as a set of one time contacts for message delivery.

Figure 3:
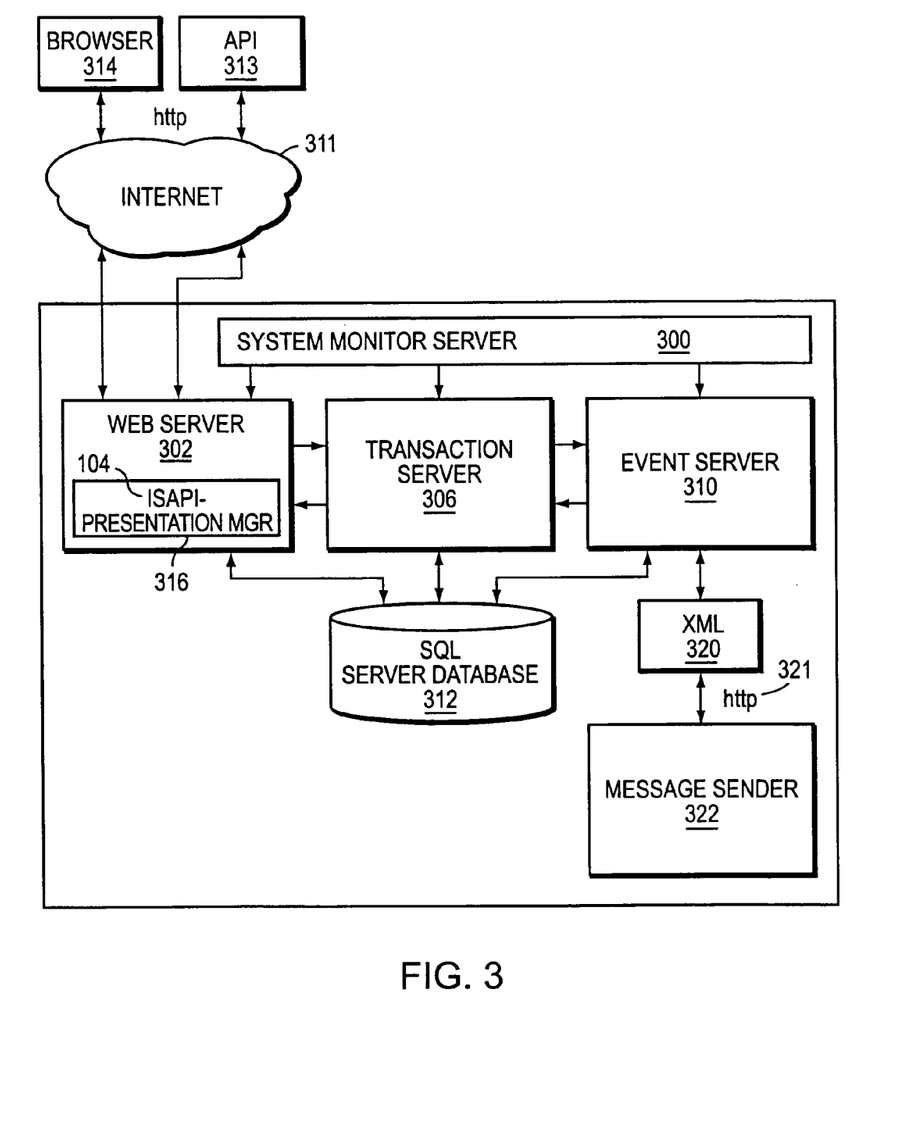
FIG. 3 is a block diagram/flow chart of an embodiment of the disclosure.

One embodiment is shown in FIG. 3. The system is a multi-tier application deployed as a collection of Windows NT (registered and use trademarks of Microsoft Corp.) services. All of the services are deployed on multiple Windows NT servers. This embodiment is extensible in that new servers can be deployed at any time in order to increase the system's capacity. The service includes Transaction Servers 306, Event Servers 310, and a System Monitoring Server 300. In addition, Microsoft SQL Server 312 as a data repository as well as Microsoft IIS (Microsoft trademarks) server as the Web Server 302.

The application's Web Server/Presentation module 304, 316 manage the visual presentation to the user's browser 314, typically a graphical user interface (GUI). Users may interact with the disclosed application via a standard web browser to sign up and subscribe to a service.

Using a browser, an administrator or user may request a page or a transaction via a hyperlink or page form submission, as is commonly used in the art via the Internet 311. This action invokes a request to the web server 302. This request is intercepted by communicating with the web server 302. Control is passed to an in-process module called the ISAPI (Internet Server Application Program Interface) 316 which accepts the inbound request. ISAPI is an interface designed by and available through Microsoft Corp. to interface with Microsoft's IIS web server.

The ISAPI 304 validates the request by extracting the session ID (identification) from the request and looking up in a database in order to validate it. Once the session is established or validated, ISAPI submits the request to the Transaction Server 606. A session ID is commonly used on the Internet to represent a logged in user. The session is a character string created by the service to uniquely identify the user for a limited period of time.

When the transaction server 306 completes the transaction, the final step and responsibility of the ISAPI layer is to render the outbound page. This is accomplished by using the Presentation Manager 316. The Presentation Manager is a rendering engine that dynamically formats a web page based on data returned from the Transaction server along with a specified template. The rendered page is returned back to the browser as standard HTML.

The transaction server 306 is an NT service that implements the primary business logic of the application. All requests submitted to the web servers are distributed to one of the running transaction servers. The transaction server determines the type of request submitted by the user, processes the request, and returns the requisite data back to the web server's presentation manager.

The transaction server receives a request from the web server. All of the data forming the request is unbundled by the transaction server. Since the transaction server implements many different transaction requests, the first task is to determine the type of transaction requested. This is done by reading the transaction type variable submitted by the user. Examples of transactions include Login, Change Password, Signup, Save Contact Information, etc.

Once the type of transaction is determined, the transaction server carries out the necessary business logic for that transaction. Typically this involves interacting with the database 312 to select, insert, or update necessary information for this transaction.

After the business logic is complete, the transaction server collects the necessary data to render a return page. This information is passed back to the web servers presentation manager for final HTML rendering for delivery to the users interface.

The Event Server 310 is an NT service that implements all of the profiling logic and message delivery logic for the application. Requests for delivery are transformed into the proper XML form as documented by the XML based API (Application Programmer Interface).

From an application viewpoint and as discussed above, the term "event" is a predetermined entity or happening to which users "subscribe." Events may be custom for each application. Examples of events include: "Flight Cancellation," "Virus Alert," etc. Users subscribe to events while Administrators determine and define happenings that, when they occur, trigger the messages being sent. When an Administrator triggers an event via browser, the Transaction Server 306 collects all of the data for that event and submits the event to the Event Server 310 for processing.

An API 313 is also available to access the disclosed system via the Internet 311 to enable an automatic event sending that does not require an administrator physically to access the system. In such a case the customer would create an application that receives information from the client's internal system. For example, when a flight is canceled by an airline, the airline's internal system, that receives the actual cancellation notice, sends a predetermined XML document with the particular information to the disclosed system that triggers the event. The system then looks up the list or recipients and contact information and has the message sent. An administrator need not be involved. In a more typical scenario the administrator via a browser physically enters that the happening occurred which triggers the message sending process.

The Event Server has four main functions when processing an event: (1) determine who, how, and when each user has subscribed to the event, (2) filter the list of recipients based on schedules (3) generate an XML 120 document representing the targeted deliveries, and (4) send the XML document to a delivery system 122 to carry out the actual delivery.

The Event Server 310 utilizes its internal rules engine to determine who has subscribed to the target event. It does this by querying the database of subscribers. Once the list of event subscribers is determined, the Event Server then determines how and when each subscriber has chosen to receive this event. The "how" is based on the configured devices the user wishes to receive the event. The "when" is based on the configured schedules the user has configured to receive the event.

The final list of subscribers and devices is then turned into an in-memory XML document representing each event subscriber along with his associated device configuration for that event. The XML document is then submitted to the delivery system via HTTP.

In order to communicate with the delivery system, the Event Server 310 first initiates an HTTP connection 321. Once the HTTP connection is established, the XML 120 document is submitted to the delivery system 322 for processing. After submitting the request, the Event Server waits for the response from the delivery system. The response is also an XML document representing the success or failure of the submitted request. The Event Server extracts the necessary status from the returned XML document and updates the SQL database 312.

The System Monitoring Server 300 is a single instance NT (Microsoft Corp. trademark) server that controls all monitoring aspects of the application. It is the responsibility of the system monitoring service to start and stop all services, distributes runtime data changes to the application services, and to constantly monitor the status of all running services.

The System Monitoring Service 300 distributes runtime data to all the services dynamically. This includes information such as server pools, various system quotas, etc. In addition this service assures that all services are continuing to function normally by querying the status of each service frequently. If the system monitoring service recognizes that a service is not responding, it immediately removes that service from the available pool of services until it can establish a successful reconnection to that service.

A series of application modules, as shown in FIG. 3, are referenced, in some above, and are described as follows:

The user launches his browser and navigates to the home page for the present disclosed application, e.g. http://www.inventivesystem.com/<application>. Using the HTML form, the user enters his Login name and password and presses the Login button. This action causes the browser to execute an HTTPS form request. The request includes the login name, password, and transaction type. This information is sent via HTTPS to the IIS web server.

The Web Server 302 immediately passes control to the ISAPI plugin. The ISAPI takes the request and sends it to one of the established Transaction servers.

The Transaction Server 106 reads in the request data and determines that this is a request for the Login transaction. Next the business logic for the login transaction is executed. This involves validating the login credentials against the member database. Once the business logic has been executed, the transaction server queries the database for the necessary data that is required for the subsequent page. This information along with a template page name is passed back to the ISAPI/Presentation Manager.

The Presentation Manager 316 receives the data and template returned from the transaction server and creates a rendered HTML page. This page is then returned back to the user via HTPPS.

The following describes the application flow example of an Administrator triggering an event. In this example, the 'Flight Delay' is used as an example.

Browser Form Submission.

The administrator launches his browser and navigates to the home page 100 of FIG. 1 for the disclosed system application: Using the HTML form, the user enters his Login name and password and presses the Login button, an object as known in the art. Through a series of page navigation and form submissions (described above), the administrator triggers a Flight Delay event.

ISAPI Request.

With respect to FIG. 3, the Web Server 302 immediately passes control to the ISAPI plugin 304 (a term of art) and the ISAPI layer takes the request and sends it to one of the established Transaction Servers.

Transaction Server Processing.

The Transaction Server 306 reads in the request data and determines that this is a request for the Create event transaction. Next the Transaction Server gathers the necessary information from the request and notifies the Event Server to process the event. The Event Server begins to process the event in parallel with the ISAPI response.

ISAPI Response.

The Presentation Manager 116 receives the data and template returned from the transaction server and creates a rendered HTML page. This page is then returned back to the user via HTTPS.

Event Server Processing.

The Event Server 310 receives the information regarding the triggered event (Ex. 'Flight Delay'). The Event Server then queries the database to determine all of the subscribers to the event. Next all of the subscribers' schedules are referenced to determine how and when each person should be contacted. From this list, the Event Server generates the proper XML representing the list of targeted deliveries.

The Event Server then opens up an HTTP connection and submits the XML request to the Message Deliver 322. Once the response is returned, the Event Server updates the local database with the return status.

An alternative embodiment will now be described. Per this alternative embodiment, a new notification application (a notification system) may be built on top of a message delivery engine. The notification system, per this embodiment, provides a basic application framework from which service specific applications are created. Users signup and subscribe to events published by service providers. Service providers trigger events and the notification system sends notification messages to the subscribers.

The notification system, per this alternative embodiment, is deployed as a separate application than that of the message delivery engine. More specifically, it is run on separate machines and in a separate environment than the message delivery engine. The only communication between the two applications will be done via MBAPI.

This notification system consists of the following components:

Web Server(s): IIS with a specified URL, such as http://www.ExpressAlert.com.
PWISAPI.dll: Isapi plugin.
IIS Helper Server: IIS Helper server providing web configuration and config server communication.
User Txn Servers: 1 or more User Txn servers providing full application logic.
Config Server: 1 Config server supplying site configuration.
Blast.exe: 1 single blast.exe command line app.
Db: A separate database.

Notification System Component Details.

The notification system is a separate self-contained application that differs from the message delivery engine.

The components include:

Blast.exe.

Command line application providing console operation to the system. This is a different blast installation than MessageBlaster (the message delivery engine). For example, issuing blast off for the notification system will only terminate those services supporting the notification system.

Configuration Server.

A single instance application providing monitoring and broadcast configuration information to the rest of the notification system application.

IIS Helper Server.

There exists one IIS Helper Server per web server. The IIS Helper Server provides over-all web configuration and web server monitoring.

PWISAPI.

There exists one instance of the PWISAPI.dll plugin per web server. This IIS web server extension is the single entry point for all web server traffic.

User Transaction Server(s).

One or more User Txn Servers handle the transaction business logic for the application.

MBAdmin.

A single instance of the MB Admin application provides a web-based front end for notification system configuration.

Terms

Portal: A co-branded site for the notification system containing 1 or more services.
Industry: A group of related services.
Service: Typically a company providing an alert notification.
Event: A single trigger for which users can subscribe to.

User Application Flow.

The following describes the application flow for this embodiment from the users standpoint.

Signup.

The notification system requires users to register an identity with the application. Once a user signs up, the login name provided during the registration can be used to subscribe to multiple services across multiple portals. Currently all accounts created with the notification system are established with the notification system domain.

Users must establish a unique login name and password along with other additional required fields in order to complete the signup process. Once the signup process is complete, an email is immediately delivered to the user containing an activation link.

Activation.

As stated above, a newly created member is created as "inactive" and can only be activated by responding to the URL sent in the activation email. Clicking on the URL will force the user to enter their username and password to activate their account.

Login.

Once the account is activated, users can login to the notification system by providing their login name and password at the login screen.

Account Profile.

The Account Profile page allows the user to edit their own profile and specifically enter their contact information. Specific contact information entries are required to subscribe to events provided by the service. The only required contact information entry is the Work Email. All others are optional.

Change Password.

Within the Account Profile page is the link for changing the password. The user must type in the original and enter the new password.

Subscribing to a Service.

Before a user can begin receiving messages from a service, the user must first subscribe to that service. Signing up to the notification system does not automatically subscribe that person to a service. Signup only establishes a unique login. The "start" page (the page presented after login) lists service(s) available to the user for subscribing. In a single service portal, there will always be only one service available, whereas in a multi-service portal there are many services to subscribe to. Each service may require additional information to complete the subscription process. For example, an airline service may require the user to enter their frequent flyer number. Also many services will require a billing plan be established before the subscription is completed.

Billing.

Each service can be configured to require the user to setup a special billing plan. For example, a company may require the user to setup a subscription based credit card billing plan with a yearly fee. Other services may provide the service for free to the users and pick up the costs on the back end. If a billing plan is required, it is presented to the user during the service subscription.

Subscribing to a Service Event.

Once the user has subscribed to a service, the next step is to select events provided by the service. For example, an airline service would typically provide the events (1) Cancelled Flight, (2) Delayed Flight, and (3) Gate Change. The user selects an event by specifying how they want to be contacted per event. A check box for each contact method is listed next to each service event.

Unsubscribe.

Within the service subscription page, a link allows the user to unsubscribe to that service. Unsubscribing first gives the user the opportunity to confirm the selection. Once confirmed, the user is unsubscribed to the service.

Administrator Application Flow.

The following describes the application flow from an Administrators standpoint. The experience is the same except that an administrator as the additional features of Edit Company profile and Create Event.

Edit Company Profile.

The Company Profile provides edits for basic company information. The contact information for the company is used as defaults for fields in the create event flow.

Creating an Event.

Events are notification triggers that the service administrator creates to alert the subscribed members. For an airline, the events could be "Cancelled flight", "Delayed flight", etc. The Create Event feature offers a wizard-like flow for creating the event.

1. Event Type—The first screen is to select the event type. The event types are predetermined by the service provider and are created via MBAdmin during service creation.
2. Event Details—The next screen is the common and event specific details for this event. The common event fields include the Subject, Sender name, return email, fax number, and pager callback number. The contact information specific fields are derived by default from the company profile. The event specific fields are derived from a boilerplate .mbd file for this specific event.
3. User Identifier—The notification system has support for events to target specific members in addition to their general subscription to the event. For example, an airline company service could have thousands of subscribers for the Cancelled flight event. However, when this even is triggered, the Administrator does not want to notify all subscribers for this event, but rather only those that are affected by it (i.e., on that plane). The service does this through a feature called User Identifiers. If this feature is enabled for a service, then the Administrator has the option of providing a list of user identifiers affected by this event.
4. Preview and Send—The final page is the Preview and Send page. This page summarizes the selection process in steps 1-3. Pressing Send from this page submits the event.

After the administrator presses send, the notification system returns immediately back to the user with the resulting "Your message is being sent page". During this time the notification system queries the database to find all members who have subscribed to the service event being triggered (taking into consideration the optional user identifiers). Based on this information, the appropriate XML request document is dynamically created and sent to the message delivery engine as a set of one time contacts for message delivery.

Creating a Single Service Portal.

This section specifies a procedure for creating a single service portal. The portal name is assumed to be MyFlight, the single service is United, and 2 events are published: (1) Cancelled Flight and (2) Delayed Flight.

1. Creating a Portal.
   a. From the main MBAdmin menu select Portals
   b. Select Create New
   c. Enter the Name "United", Abbreviation "United", Homepage "xxx.mbd". Note the abbreviation is used as the domain based URL for UI co-branding.
   d. Press OK. The Portal is created and the Web server is updated just as a new domain is.
2. Create an Industry.
   a. From the main MBAdmin menu, select Organizations.
   b. Drill down into the Domain.
   c. Select New Organization.
   d. Enter a name "Airlines", and abbreviation "Airlines" (used for themes/described later) and select the Industry type.
   e. Press OK. The new industry is now created.
3. Creating an Industry Event.
   a. Drill into the newly created industry "Airlines".
   b. Select New Event from the Industry Events table.
   c. Enter a name "Cancelled Flight" and a Boilerplate "Cancelled Flight". The Boilerplate specifies a .mbd file that contains information displayed to the user about this event.
   d. Press OK. The new event is created in this industry. Do the same for Delayed Flight.
4. Creating a Service.
   a. Drill into the newly created industry "Airlines".
   b. Select New Organization.
   c. Enter a Name "United", Abbreviation "United" and select the "Company" type. A Company is the same as a service.
5. Creating Service Events. To create an event specific for a given service, you must select events from the event pool created in step 2.
   a. Drill into the newly created company/service "United".
   b. Select Edit Service Events.
   c. Check off the industry service events that are supported in this service and press OK.
6. Service Login. The Service login is the name and password used by the notification system when sending MBAPI requests to the message delivery engine. This is not the OEMID, but rather the name of a user on the message delivery engine database that is used to submit the XML request.
   a. Select Edit Service Login.
   b. Enter the name and password and press OK.
7. Creating a Service Administrator. One or more Service Administrators must be created for each service. The service administrator has the privilege of sending event notifications for this service.
   a. Select New Administrator.
   b. Enter first name, last name, member name, and password.

8. Assigning a Service to a Portal. The final step in MBAdmin is to associate the "United" service with the "United" portal.
   a. Select Add Service to Portal
   b. Select the United Portal and press OK.

Template Organization.

The template organization is tightly coupled with the portal/industry/service/event configuration in the database. Most of the user interface within the notification system is dynamically formatted per the portal/industry/service/event.

A Notification System in Action.

What is claimed is:

1. Apparatus comprising:
   a communication interface configured to communicate with a message delivery system and adapted to cause, via the message delivery system, a given event-specific message to be sent to a corresponding list of recipients;
   a trigger interface configured to receive an indication that a given event has occurred and to trigger sending of the given event-specific message;
   storage device encoded subscriber-originated recipient list data representing the corresponding list of recipients, where the corresponding list of recipients originated from inputs by event subscribers; and
   a display including a user interface configured to display and receive input from, via a computer screen display, plural sets of screen-displayed destination setting selection indicators for individually configuring sets of destination settings for corresponding event types, each set of destination settings corresponding to a corresponding one of plural selectable event types selectable for causing corresponding triggered messages to be sent including sending the given event-specific message to the corresponding list of recipients, where individual ones of the selectable event types for a given user have corresponding differently configurable sets of destination settings, whereby the given user's selected destination settings for one selected event type cause one event-specific message to be sent to one device of the given user and the given user's selected destination settings for another selected event type cause another event-specific message to be sent to another device of the given user that is different than the one device, and where selected ones of the selectable event types for the given user are selected by a user selecting, via the computer screen display, destination selection indicators corresponding to the selected ones of the selectable event types.

2. The apparatus according to claim 1, wherein the message includes a notification message.

3. The apparatus according to claim 1, wherein the trigger interface includes a machine-embodied application program interface configured to receive an automated indication that the given event has occurred.

4. The apparatus according to claim 1, wherein the trigger interface includes an administrator trigger happening input configured to receive an indication of the given event occurrence via a computer screen interface.

5. The apparatus according to claim 1, wherein the computer-readable media encoded subscriber-originated recipient list data includes an XML document submitted to the delivery system by the communication interface via an HTTP protocol.

6. The apparatus according to claim 5, wherein the XML document represents a list of targeted deliveries, based on all the subscribers to the event and based on references to the subscribers' schedules to determine how and when each subscriber is to be contacted.

7. The apparatus according to claim 1, further comprising computer-readable media encoded provider-originated recipient list data representing a provider-originated list of recipients.

8. The apparatus according to claim 1, wherein the user interface includes a subscriber interface for subscribers to configure event notification settings.

9. The apparatus according to claim 1, wherein the trigger interface includes a provider event notification creation interface configured to receive, via computer screen input, information to create a given event notification corresponding to a given event type.

10. The apparatus according to claim 9, wherein the provider event notification creation interface includes a wizard user interface sequence generator.

11. The apparatus according to claim 9, wherein the event notification creation provider interface includes an event selection interface.

12. The apparatus according to claim 11, wherein the event selection interface comprises a computer screen interface.

13. The apparatus according to claim 1, wherein the user interface includes a graphical user interface.

14. The apparatus according to claim 1, wherein the user interface includes a standard web browser.

15. The apparatus according to claim 1, wherein the destination selection indicators include check boxes for each of plural contact methods.

16. The apparatus according to claim 15, wherein the destination selection indicators include a set of the check boxes for each selectable event type.

* * * * *